United States Patent
Milliere et al.

(10) Patent No.: US 8,814,092 B2
(45) Date of Patent: Aug. 26, 2014

(54) ENERGY-ABSORBING STRUCTURAL ELEMENT MADE OF A COMPOSITE MATERIAL AND AIRCRAFT FUSELAGE HAVING SAID ABSORBER

(75) Inventors: Jérôme Milliere, Leguevin (FR); David Andissac, Toulouse (FR); Cécile Raulot, Blagnac (FR); Olivier Vincent, Cornebarrieu (FR)

(73) Assignee: Airbus Operations S.A.S., Toulouse (FR)

( * ) Notice: Subject to any disclaimer, the term of this patent is extended or adjusted under 35 U.S.C. 154(b) by 974 days.

(21) Appl. No.: 12/866,935

(22) PCT Filed: Feb. 13, 2009

(86) PCT No.: PCT/FR2009/050235
§ 371 (c)(1),
(2), (4) Date: Nov. 9, 2010

(87) PCT Pub. No.: WO2009/101372
PCT Pub. Date: Aug. 20, 2009

(65) Prior Publication Data
US 2011/0042513 A1 Feb. 24, 2011

(30) Foreign Application Priority Data
Feb. 15, 2008 (FR) ...................................... 08 50966

(51) Int. Cl.
*B64C 1/10* (2006.01)
*B64D 7/00* (2006.01)
*B64C 1/06* (2006.01)
*F16F 7/12* (2006.01)

(52) U.S. Cl.
CPC ................. *B64C 1/062* (2013.01); *F16F 7/127* (2013.01); *B64C 1/064* (2013.01)
USPC ......................................................... 244/121

(58) Field of Classification Search
USPC .............. 244/100 R, 105, 107, 119; 293/130, 293/133; 188/371, 376
See application file for complete search history.

(56) References Cited

U.S. PATENT DOCUMENTS

| 3,608,677 A | 9/1971 | Wykes |
| 3,779,591 A | 12/1973 | Rands |

(Continued)

FOREIGN PATENT DOCUMENTS

| DE | 43 13 592 A1 | 10/1994 |
| DE | 44 25 829 C1 | 10/1995 |

(Continued)

OTHER PUBLICATIONS

International Search Report, dated Jul. 27, 2009, from corresponding PCT application.

Primary Examiner — Valentina Xavier
(74) Attorney, Agent, or Firm — Young & Thompson (57) ABSTRACT

An aircraft fuselage has at least one reinforcement frame (13), at least one crossbar (14) and at least one energy-absorbing structural element (2) that includes a compression beam (21) having a longitudinal axis Z and oriented substantially in the direction of compression forces to be absorbed upon an impact, the compression beam being attached at a first end (213) thereof to the crossbar (14) and at a second end (214) thereof to the reinforcement frame (13). The compression beam (21) is attached at least one of its ends (213, 214) via a shoulder bracket (22), wherein the shoulder bracket further has the function of cutting the compression beam (21) in case of an impact.

16 Claims, 4 Drawing Sheets (56) References Cited

U.S. PATENT DOCUMENTS

| | | |
|---|---|---|
| 5,542,626 A | 8/1996 | Beuck et al. |
| 6,378,349 B1 * | 4/2002 | Waldrop ..................... 72/326 |
| 6,601,886 B1 | 8/2003 | Thayer |
| 7,484,781 B1 * | 2/2009 | Garber et al. ................ 293/133 |
| 8,388,259 B2 * | 3/2013 | Amengual Pericas ............ 404/6 |
| 2003/0034484 A1 * | 2/2003 | Buth et al. ................... 256/13.1 |
| 2003/0034659 A1 | 2/2003 | Summe et al. |
| 2004/0231937 A1 | 11/2004 | Goodworth et al. |

FOREIGN PATENT DOCUMENTS

| | | | |
|---|---|---|---|
| DE | 196 23 449 A1 | 1/1998 | |
| DE | 198 12 579 A1 | 9/1999 | |
| DE | 10200605644 A1 * | 11/2006 | ............... F16F 7/12 |
| FR | 2 657 130 A1 | 7/1991 | |
| WO | 2008/065083 A1 | 6/2008 | |

\* cited by examiner

ENERGY-ABSORBING STRUCTURAL ELEMENT MADE OF A COMPOSITE MATERIAL AND AIRCRAFT FUSELAGE HAVING SAID ABSORBER

The present invention relates to an aircraft primary structure. More specifically, the invention relates to an aircraft primary structure designed to absorb the energy dissipated in a sudden compressive load, particularly in the event of an impact following an accident such as a hard landing or ditching that stresses the fuselage along its vertical axis (crash with vertical component).

The fuselage of an aircraft mainly comprises a structure made up of a skin internally reinforced with reinforcing fuselage frames and stringers. The reinforcing fuselage frames are positioned at sections of the fuselage substantially perpendicular to a longitudinal axis of the fuselage and the stringers essentially run along the longitudinal axis. The reinforcing fuselage frames support crossmembers, which are generally straight and horizontal, in an aircraft frame of reference, to which floors are attached.

In a crash with a vertical main component, the lower part of the fuselage is, generally speaking, the first part of the aircraft to be subjected to impacts and therefore plays a part in absorbing the energy of the impacts in an essential way.

The certification of aircrafts, particularly passenger airplanes, dictates how the fuselage must behave in various crash situations, so as to improve the chances of survival of the passengers in the event of an accident.

In the case of aircraft the fuselage structure of which is created from structural elements (reinforcing fuselage frames, skin, stringers, crossmembers) made of metal, a significant amount of the impact energy is absorbed by the plastic deformation of the elements of the metallic structure. It is not generally necessary to provide dedicated energy-absorbing systems because the structure passively performs the energy-absorbing function because of the intrinsic properties of the metal alloys used and because of a suitable design.

The lower part of the fuselage is therefore designed in order mainly to cope with the stresses encountered during normal commercial operation of the aircraft.

Constant improvement in aircraft performance is now stimulating increasing use of structural elements made of composite materials for the structure of the aircraft fuselage, because of the weight saving that these composite materials offer for such structures.

However, unlike structural elements made of metallic materials which have a large plastic deformation domain before yielding, composite materials have practically no plastic domain before yielding.

A fuselage structure (fuselage frame, skins, stringers, etc.) made of composite material therefore behaves in a very different way to a fuselage structure made of metallic material, in terms of energy absorption and, at the end of stressing, before or after yielding, a structure made of composite material will restore a large proportion of the energy absorbed during elastic deformation.

One known solution is to insert, between the floor and the lower fuselage frames, structural elements the construction of which allows their failure to be initiated under a predefined intensity of stress that exceeds the nominal stress intensities in service. When these structural elements are made of composite materials with fiber reinforcement, failure occurs by decohesion or delamination of the material. These potentially energy-absorbing elements are connected to the floor crossmembers and to the fuselage frames by fixings of the rivet type.

When faced with the nominal stress levels, the structural elements act like stiffeners. In the event of overload, for example in the event of an accident, said structural elements are triggered and collapse. Because this phenomenon is irreversible, it dissipates energy. Moreover, it takes place at substantially constant load except during the initiation and at the end of travel when the floor ultimately strikes the lower part of the fuselage.

However, this progressive phenomenon of destroying the material of the beam, which theoretically allows progressive collapse of the energy absorber onto itself, is difficult to control and to predict, even under laboratory conditions.

Furthermore, if the fixings shear or are pulled out by the load applied to the beam following the crash scenario, said beam, instead of performing its energy-absorbing function, if the destruction of the material is poorly initiated, breaks free and may behave like an impact ram and prematurely damage other structures, such as the floor. Such a solution is not therefore satisfactory because it is not suited to how an element is required to behave in a crash with a vertical main component.

The use of elements in the region of aircraft primary structures that makes it possible to combine the use of structural elements (reinforcing fuselage frames, skin, stringers, etc.) made of composite material for the primary structures and the requirements regarding behavior in the event of a crash, particularly a vertical one, by absorbing energy is therefore essential to improving the chances of survival of the passengers aboard the aircraft.

An aircraft fuselage primary structure comprises:
  a skin comprising stringers to stabilize it,
  at least one reinforcing fuselage frame,
  at least one crossmember attached to said at least one reinforcing fuselage frame,
  at least one structural element of elongate shape, known as an energy-absorbing structural element, comprising a compression beam, preferably made of composite material, in a longitudinal Z axis, oriented substantially in a direction of compressive forces that are to be absorbed in the event of an impact, said compression beam being attached at a first end to the crossmember, and at a second end to the reinforcing fuselage frame.

According to the invention, the compression beam of the at least one energy-absorbing structural element is attached, at least at one of its ends, by means of a gusset plate, said gusset plate comprising:
  guide means for guiding the beam substantially along its longitudinal axis Z,
  a cutting element for cutting the compression beam into at least two strips, in the direction of the longitudinal axis Z,
  a clearance groove for each strip.

The compression beam comprises a web and two flanges having, over a certain length at its end nearest the gusset plate, a cross section, in a plane normal to the longitudinal axis Z, that is U-shaped, said beam being attached to the gusset plate by fixings that absorb ultimate stresses, able to absorb the stresses to which the energy-absorbing structural element is subjected outside of the impact scenario.

In one embodiment of the gusset plate, said gusset plate comprises a cutting element that has a blade directed toward the web of the compression beam and two clearance grooves situated one on each side of the blade.

In an improved embodiment of the gusset plate, said gusset plate comprises a cutting element that has two blades directed toward the web of the beam and three clearance grooves, two adjacent clearance grooves being separated from one another by a blade.

For preference, the compression beam is made of a stack of plies, each ply being produced from continuous fibers held in place by a resin. Said beam comprises plies directed substantially along the longitudinal axis Z mainly characterizing the longitudinal strength of the compression beam and plies that are inclined with respect to the direction of the longitudinal axis Z mainly determining the resistance of the compression beam to being cut by the cutting element in an impact.

For preference, to encourage the start of cutting of the web of the compression beam, said compression beam comprises, at its first end, a starting notch facing each blade when the compression beam is attached to the gusset plate.

In one embodiment, the gusset plate is made of a metallic material, at least in part.

The invention also relates to an energy-absorbing structural element intended to absorb compressive loads between two structural parts of an aircraft fuselage, comprising a compression beam made of composite material, of longitudinal axis Z, directed substantially in a direction of compressive forces that are to be absorbed in the event of an impact, wherein that said at least one energy-absorbing structural element comprises at least one gusset plate, attached at least to one of the ends of the compression beam and intended to transmit the compressive loads to the structural part to which said gusset plate is attached, said gusset plate comprising:
- guide means for guiding the beam substantially along its longitudinal axis Z,
- a cutting element for cutting the compression beam into at least two strips, in the direction of the longitudinal axis Z,
- a clearance groove for each strip.

In one embodiment, a gusset plate is attached to each end of the compression beam.

The detailed description of the invention is given with reference to the figures which depict.

Figure 1:
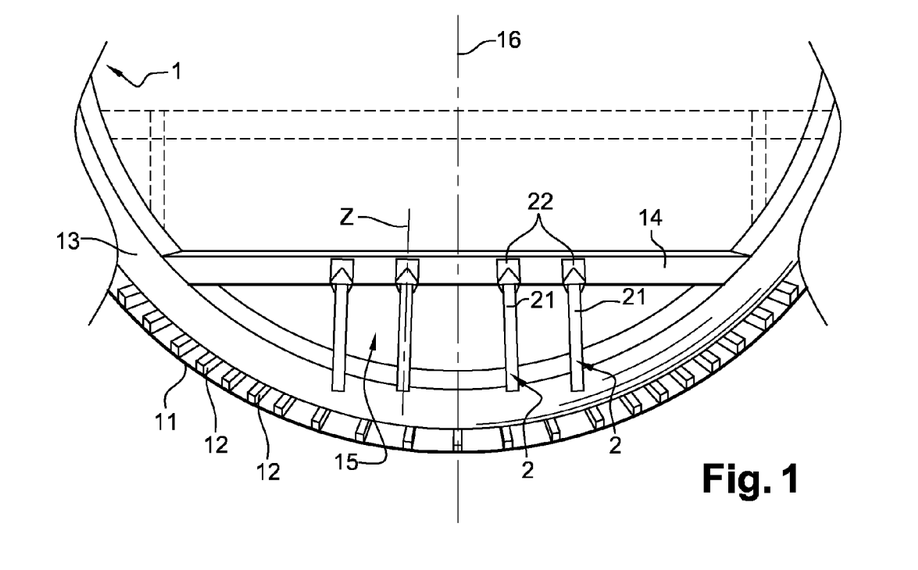
FIG. 1: a perspective view, schematically depicting a lower part of a portion of an aircraft fuselage primary structure comprising four energy-absorbing structural elements under a floor, all produced according to the invention.

An aircraft fuselage primary structure comprises, as illustrated in FIG. 1, a substantially cylindrical framework 1 to which there is attached a skin 11 which is reinforced by stringers 12 running substantially along a longitudinal axis of the aircraft fuselage primary structure.

The framework 1 of the aircraft fuselage primary structure is made up mainly of reinforcing fuselage frames 13. Said reinforcing fuselage frames are positioned at fuselage sections substantially perpendicular to the longitudinal axis of the fuselage and are uniformly distributed along the entire length of the aircraft fuselage. Each of them has a shape that appreciably corresponds to the local cross section of the fuselage, usually circular, at least locally, as in the example of FIG. 1.

Attached to each reinforcing fuselage frame 13 is a crossmember 14. The crossmembers 14 are advantageously straight and horizontal, in an aircraft frame of reference, so that they can support a floor (not depicted), such as the floor of a cargo hold or of a passenger cabin.

Furthermore, the framework 1, in a lower part 15 of the aircraft fuselage primary structure situated between the crossmembers 14 and the reinforcing fuselage frames 13, comprises at least one energy-absorbing structural element 2. In the exemplary embodiment illustrated in FIG. 2, two energy-absorbing structural elements 2 are depicted. Each energy-absorbing structural element 2 comprises:
- a compression beam 21,
- at least one gusset plate 22.

Figure 2:
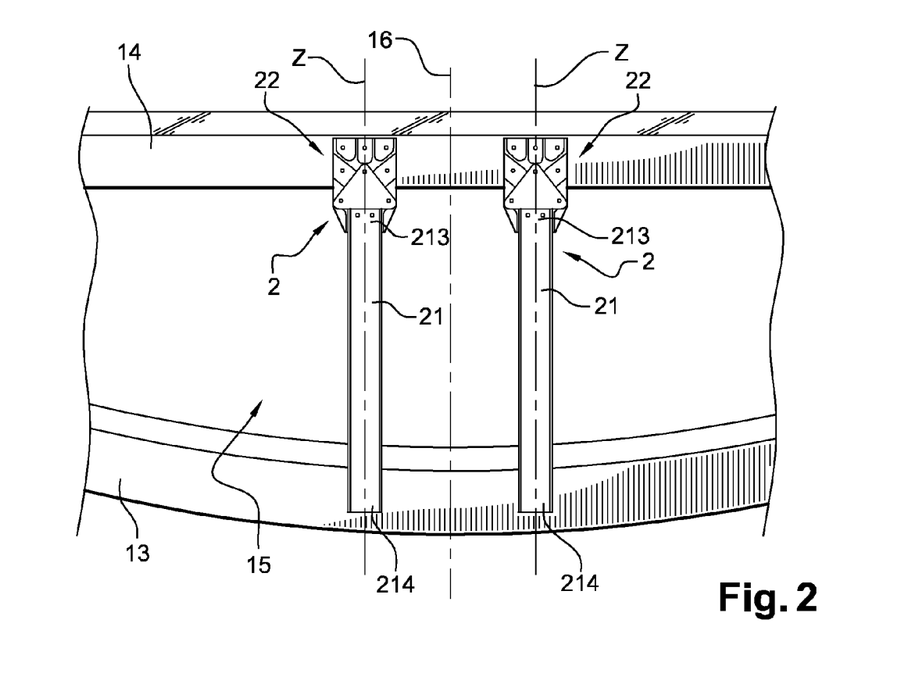
FIG. 2: a front view of two energy-absorbing structural elements of a fuselage according to the invention.

The compression beam 21 is connected, on the one hand, at a first end 213, to a crossmember 14 and, on the other hand, at a second end 214, the opposite end to said first end, to a reinforcing fuselage frame 13.

The compression beam is attached, at least at one of its two ends 213, 214, by means of a gusset plate 22.

For each crossmember—reinforcing fuselage frame assembly, the compression beams 21 have a longitudinal axis Z directed substantially in the direction of the compressive forces that are to be absorbed in the event of an impact, for example substantially vertically under a floor, and the energy-absorbing structural element or elements are arranged substantially symmetrically with respect to a vertical longitudinal plane of symmetry 16 of the aircraft fuselage.

In the exemplary embodiment illustrated in FIG. 1, for a crossmember—reinforcing fuselage frame assembly, four energy-absorbing structural elements 2 are positioned symmetrically in pairs with respect to the vertical longitudinal plane of symmetry 16 of the aircraft fuselage primary structure, without this choice in any way limiting the invention.

The role of the energy-absorbing structural element 2 is two-fold. Firstly, the energy-absorbing structural element 2 transfers loads between the crossmember 14 and the reinforcing fuselage frame 13 when the fuselage structure is subjected to the normal loadings corresponding to stresses encountered during normal use of the aircraft, increased by factors of safety. Secondly, the energy-absorbing structural element 2, thanks to the elements of which it is made, ensures that the beam 21 is destroyed progressively when said beam is subjected to a compressive load applied in the direction of its length, that is to say in the example illustrated substantially vertically, that corresponds to the loadings encountered in a crash scenario. Progressive destruction of the compression beam 21 has the effect of absorbing some of the energy generated in the impact.

The gusset plate 22 further performs a function of cutting the compression beam 21.

Figure 3:
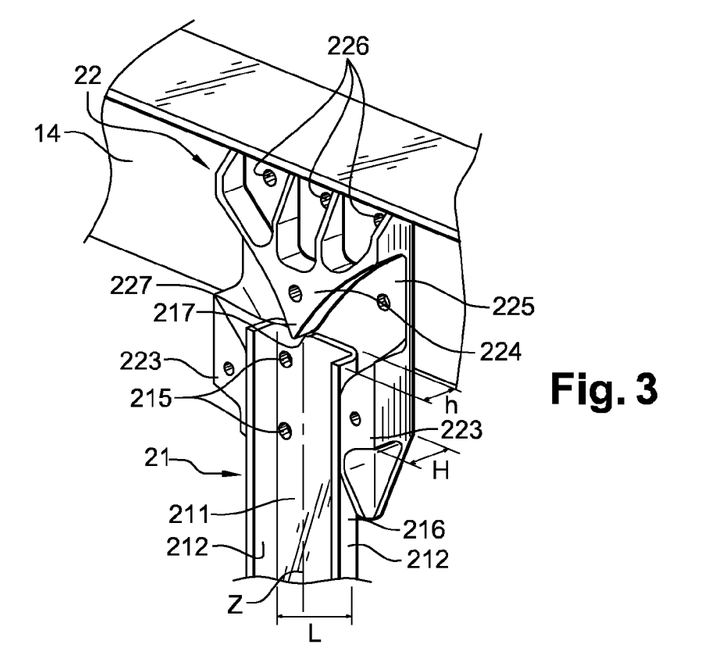
FIG. 3: a perspective view of an energy-absorbing structural element according to one embodiment and comprising a compression beam.

The gusset plate 22 comprises, as illustrated in FIG. 3:
- guide means 223, able to guide the translational movement of the compression beam 21 substantially in the direction of its longitudinal axis Z when enough compressive load is applied to the beam,
- a cutting element 224, designed to cut the beam in the direction of the longitudinal axis Z into strips when said beam is guided in translational movement in the guide means 223,
- at least one clearance groove 225, designed to remove the strips cut from the beam.

Figure 4:
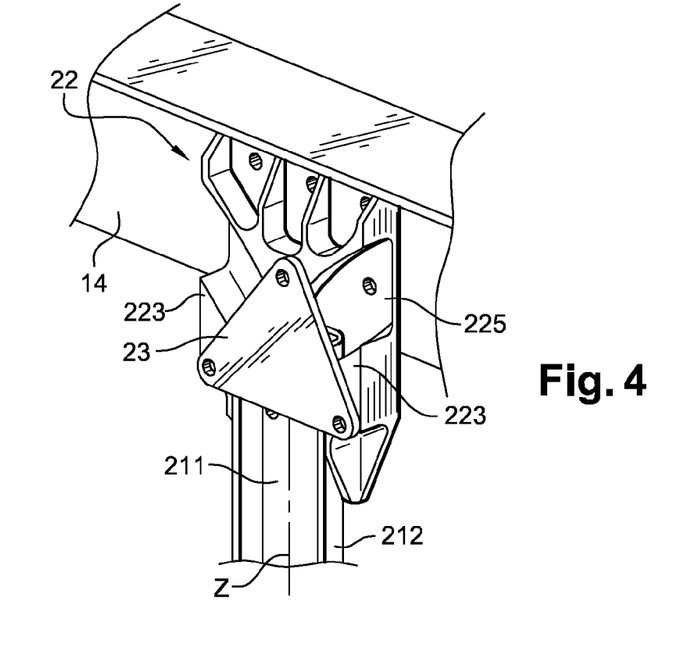
FIG. 4: a perspective view of an energy-absorbing structural element according to one embodiment, comprising a compression beam and a component for holding said beam.

In one embodiment of an energy-absorbing structural element 2, the beam 21 has, at least over a certain length at its nearest end the gusset plate, a cross section in a plane normal to the longitudinal axis Z that is U-shaped and comprises a web 211 of width L and two flanges 212 of height h. In the example illustrated in FIGS. 3 and 4, the beam has, over its entire length, a U-shaped cross section in a plane normal to the longitudinal axis Z.

The gusset plate 22 is substantially plate like. Said gusset plate comprises:
the guide means 223,
the cutting element 224,
two clearance grooves 225.

The first end 213 of the beam 21 is attached, for example at its web 211, to the gusset plate 22 by fixings, known as working fixings 215, that absorb the confining stresses to which the energy-absorbing structural element 2 is subjected outside of an impact scenario.

In one exemplary embodiment, the gusset plate 22 is attached to the crossmember 14 or to the reinforcing fuselage frame 13 using fixings 226.

The second end 214 of the beam 21 is attached to the reinforcing fuselage frame 13. The second end may be assembled by conventional means or in the same way as on the crossmember 14, using the gusset plate 22.

However, for preference, the gusset plate 22 is used on the crossmember 14 so as to avoid possible destruction of said gusset plate, and chiefly of the cutting element 224, on the reinforcing fuselage frame 13, upon an impact in the lower part of the fuselage.

In another exemplary embodiment, the gusset plate 22 is used at each end of the beam on the crossmember 14 and on the reinforcing fuselage frame 13.

In a preferred embodiment, the beam 21 is made of a composite material and consists of a stack of plies. Each ply is made of continuous fibers held in position by a resin.

In one exemplary embodiment, the plies are unidirectional, woven or braided.

The stack of plies comprises:
firstly, plies for essentially transferring loads in nominal operation without putting up any significant resistance to the tearing of the web 211, such as plies at 0° for example, that is to say plies directed along the longitudinal axis of the beam,
and secondly, plies that are inclined with respect to the longitudinal axis and which, on the one hand, transfer some of the load in nominal operation and, on the other hand, determine the resistance of the compression beam 21 to cutting by the cutting element 224 in the event of an impact, such as plies at ±45° and 90° for example, that is to say plies directed at ±45° and at 90° with respect to the longitudinal axis of the beam.

In one exemplary embodiment, the beam 21 is made of a stack of 14 plies, of the 6/3/3/2 type: 6 plies at 0°, 3 plies at 45°, 3 plies at −45° and 2 plies at 90°.

In another embodiment, the beam 21 is made of a metallic material.

In one embodiment, the beam 21 is of constant cross section.

In another embodiment, the beam 21 is of constant cross section and thickness.

In another embodiment, the beam 21 has, at its end nearest the gusset plate 22 and over a certain length, a cross section of a size appreciably smaller than that of a cross section over the remaining length of the beam 21.

For preference, the beam 21 has, facing the cutting element 224, a notch 217 to encourage the start of cutting of the web 211 of the beam 21. For preference, the notch 217 is positioned substantially mid-way across the width of the web.

The guide means 223 are positioned against exterior faces 216 of each flange 212 of the beam 21 so as to guide said beam along its longitudinal axis.

For preference, the guide means have a depth H substantially smaller than the height h of the flanges 212 of the beam 21, so as to allow for the fitting of the holding piece 23, taking production tolerances into consideration.

The cutting element 224 comprises a blade 227 provided with a cutting edge directed toward the compression beam 21, positioned facing the notch 217 of the compression beam 21, when said compression beam has such a notch, and preferably positioned substantially mid-way across the width of the web. The blade preferably has a substantially V-shape at the cutting edge. The blade 227 has a length at least equal to a maximum thickness of the web 211 of the compression beam 21. For example, the length of the blade 227 is substantially equal to the height h of the flanges 212 of the compression beam 21.

The two clearance grooves 225 are situated one on each side of the blade 227 and allow the strips each comprising one flange 212 of the compression beam 21 and part of the web which remains attached to each flange to be removed on each side of the gusset plate 22 so as to prevent hard contact with, amongst other things, the crossmember 14 as this could disrupt the dynamics of the destruction of the compression beam.

Advantageously, a retaining piece 23 is attached to the gusset plate 22 to hold the compression beam 21 in the guide means 223 of said gusset plate and guarantee that the web 211 of the compression beam 21 is kept facing the blade 227 as the beam compresses. For example, when the thicknesses of the cutting element 224 and of the guide means 223 are substantially equal to the height h of the flanges 212, the retaining piece 23 is attached to the gusset plate 22 in the region of said guide means and of said cutting element.

Figure 5:
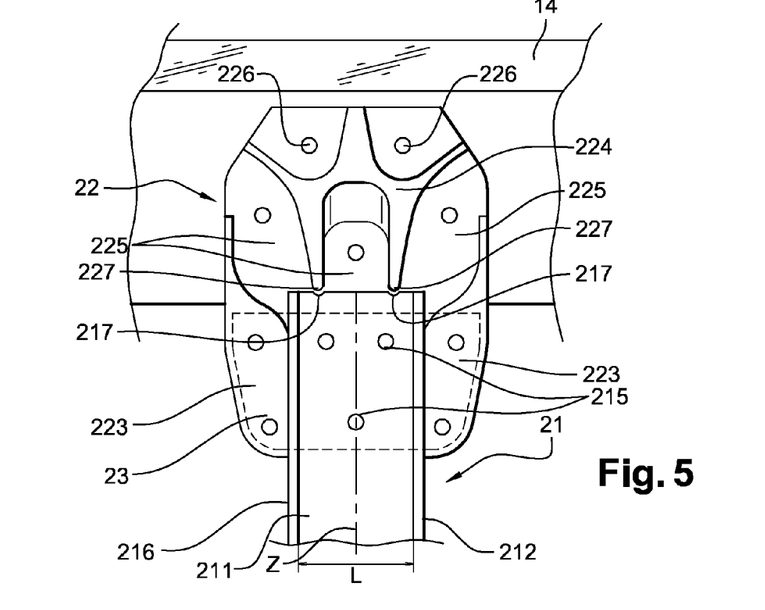
FIG. 5: a front view of an energy-absorbing structural element according to an improved embodiment.

In an improved embodiment of the gusset plate 22, as illustrated in FIG. 5, said gusset plate comprises:
the guide means 223,
the cutting element 224 comprising two blades 227,
three clearance grooves 225.

The guide means 223 are positioned against the exterior faces 216 of each flange 212 of the compression beam 21 so as to guide said compression beam along the longitudinal axis Z.

The cutting element 224 comprises two blades 227, each provided with a cutting edge directed toward the compression beam, distant from one another by at most the width L of the web 211 of the compression beam 21 and, for example, positioned substantially in the vicinity of each flange 212 of the beam 21.

For preference, the compression beam 21 comprises, facing each blade 227, a notch 217 to encourage the start of cutting of the web 211 of the compression beam 21.

Two clearance grooves 225 allow the strips each comprising a flange 212 of the compression beam 21 and a part of the web that remains secured to each flange to be removed, on each side of the gusset plate 22, so as to avoid hard contact with, amongst other things, the crossmember 14 as this could disrupt the dynamics of the destruction of the compression beam 21.

The third clearance groove 225 situated between the two blades 227 of the cutting element 224 can be used to remove the strip comprising the remaining part of the web 21 of the compression beam from the front.

Advantageously, a retaining piece 23 is attached to the gusset plate 22 to hold the compression beam 21 in the guide means 223 of said gusset plate and ensure that the web 211 of the compression beam 21 is held facing the blades 227 during compression of said beam. For example, the retaining piece 23 is attached to the gusset plate 22 in the region of said guide means so as to allow the strip comprising the remaining part of the web 211 of the compression beam 21 to be removed via the third clearance groove 225.

For preference, the cutting elements 224 are substantially identical for all the energy-absorbing structural elements 2.

In one embodiment, the gusset plate 22 is made of a metallic material, advantageously of aluminum, an aluminum alloy, or a steel alloy, so as not to impose a significant mass penalty on the fuselage primary structure.

In a preferred embodiment, the gusset plate 22 is made of a composite material with fiber reinforcements in the form of chopped long fibers, of a length of the order of 50 mm, for example made of carbon fiber.

In one embodiment, the guide means 223, the clearance grooves 225, the cutting element 224 and the at least one blade are produced by machining or by molding.

In an improved embodiment, the gusset plate is made of a fiber-reinforced composite material, based on short fibers, for example carbon fibers, and produced, for example, from a stamping process. The cutting edge of the at least one blade 227 of the cutting element 224 is an added element, for preference co-molded with the gusset plate, and preferably made of a metallic material, advantageously a titanium alloy, so as to give lasting cutting abilities.

For preference, the blade, at the cutting edge, has an angle α (FIG. 7b), known as the blade angle, of between 30° and 45°, for example of 37°.

A value at which the energy-absorbing structural element is triggered is determined by calculating a value at which the working fixings yield.

Under nominal operation, that is to say when the loads are below or equal to the normal loads likely to be encountered in commercial operation, increased by the associated factors of safety, each energy-absorbing structural element 2 performs a function of transferring load between a crossmember 14 and a reinforcing fuselage frame 13.

In the event of a crash, there is an increase in the load applied to the compression beam 21 along the vertical axis. Following this increase, there are two possible trigger scenarios for the energy-absorbing structural element 2:

a first corresponding to yielding of the fixings in shear, which triggers the energy-absorbing structural element 2.

The compression beam 21 then moves along its longitudinal axis Z, which is substantially the movement imposed by the compressive loads, the web 211 of the compression beam 21 being torn by the cutting element 224.

a second corresponding to yielding of the compression beam 21 by bearing in the region of the fixings, triggering the energy-absorbing structural element 2.

The compression beam 21 then moves along its longitudinal axis Z, which is substantially the movement imposed by the compressive loads, the web 211 of the compression beam 21 being torn by bearing by the working fixings.

In this second trigger scenario, the cutting element 224 cuts the web 211 of the compression beam 21 in addition to the bearing tearing generated by the fixings.

In addition, advantageously, the cutting element 224 also has a so-called "failsafe" function for the event of premature yielding of the working fixings in shear so that they no longer in this instance perform their function of tearing the compression beam 21 with bearing.

Figure 6:
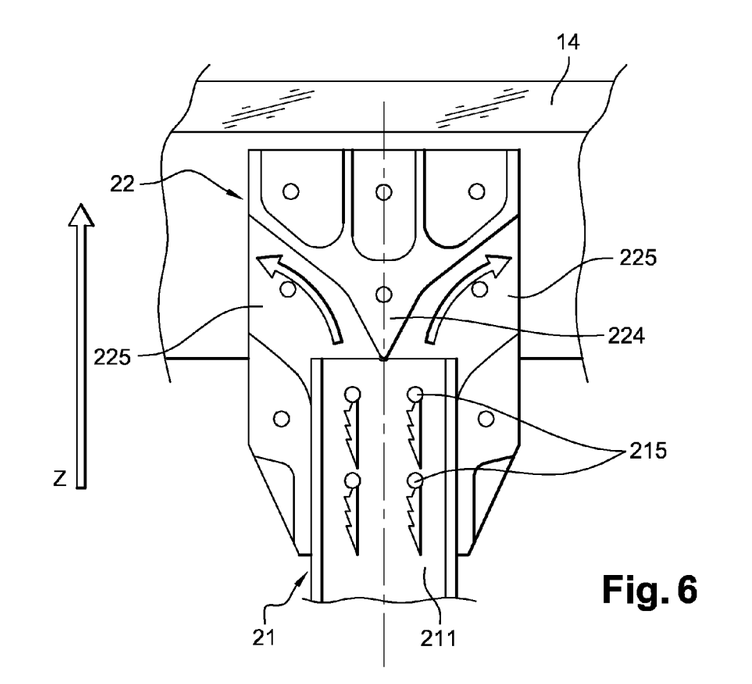
FIG. 6: an illustration of the removal of the strips of the compression beam according to one embodiment.

In the first embodiment, the strips, each of which comprises one flange 212 of the compression beam 21 and part of the web that remains secured to each flange, are guided on each side of the blade 227 of the cutting element 224 via the two clearance grooves 225, as illustrated in FIG. 6.

Figure 7A:
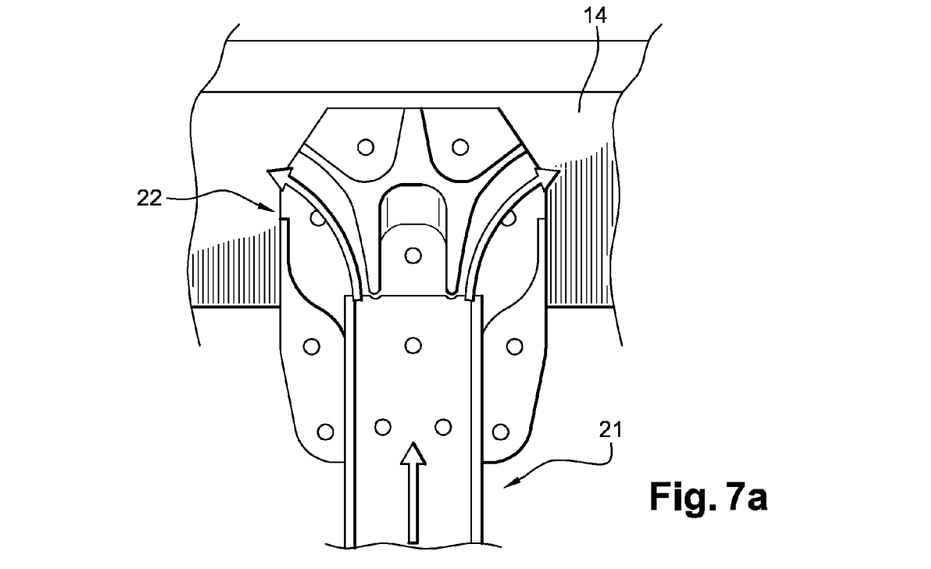
FIGS. 7a, 7b: illustrations of the removal of the strips of the compression beam according to the improved embodiment.
Figure 7B:
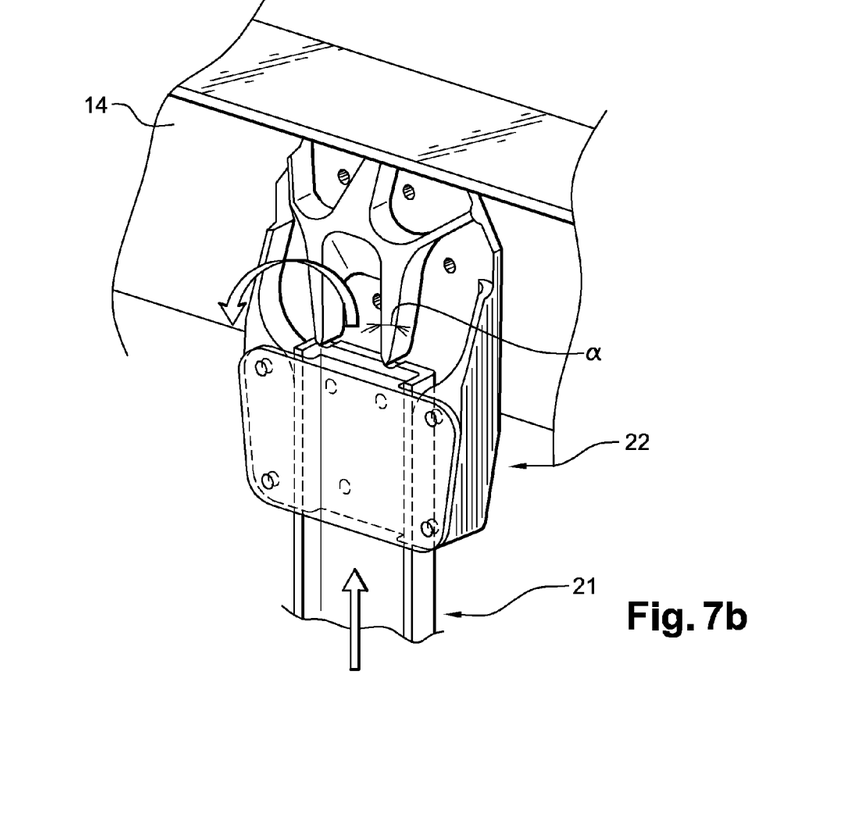

In the improved embodiment, the strips, each of which comprises one flange 212 of the compression beam 21 and the remaining part of the web that remains attached to each flange, are guided by two clearance grooves 225, and the strip comprising the web 21 of the compression beam 21 is guided by the third clearance groove 225, situated between the two blades 227 of the cutting element 224, as illustrated in FIGS. 7a and 7b.

Progressive destruction of the compression beam over its length thus dissipates the energy generated in the impact.

The invention claimed is:

1. An aircraft fuselage primary structure comprising:
a skin (11),
at least one reinforcing fuselage frame (13),
at least one crossmember (14) attached to said at least one reinforcing fuselage frame (13), and
at least one structural element (2) of elongate shape, comprising a compression beam (21) of longitudinal axis Z made of composite material, said material comprising plies of continuous fibers held in place by a resin, said compression beam, the axis of which is directed substantially in a direction of compressive forces that are to be absorbed in the event of an impact, being attached at a first end (213) to the crossmember (14), and at a second end (214) to the reinforcing fuselage frame (13),
wherein the compression beam (21) is attached, at least at one of the first and second ends (213, 214), by a gusset plate (22), said gusset plate comprising:
guide means (223) for guiding the beam (21) substantially along its longitudinal axis Z,
a cutting element (224) for cutting the compression beam (21) into at least two strips, in the direction of the longitudinal axis Z, and
a clearance groove (225) for each of said at least two strips.

2. The aircraft fuselage primary structure as claimed in claim 1, wherein the compression beam (21) comprises a web (211) and two flanges (212) having, at least over a certain length at its end nearest the gusset plate (22), a cross section, in a plane normal to the longitudinal axis Z, that is U-shaped, said beam being attached to the gusset plate (22) by fixings that absorb the ultimate stresses to which the energy-absorbing structural element (2) is subjected outside of an impact scenario.

3. The aircraft fuselage primary structure as claimed in claim 2, wherein the cutting element (224) has a blade (227) directed toward the web (211) of the compression beam (21) and two of said clearance groove (225), each of which is situated on a respective side of the blade (227).

4. The aircraft fuselage primary structure as claimed in claim 2, wherein the cutting element (224) has two blades (227) directed toward the web (211) of the beam (21) and three clearance grooves (225), two adjacent ones of said clearance grooves being separated from one another by one of said blades (227).

5. The aircraft fuselage primary structure as claimed in claim 1, wherein the compression beam (21) comprises plies directed substantially along the longitudinal axis Z mainly characterizing the longitudinal strength of the compression beam and plies that are inclined with respect to the direction of the longitudinal axis Z mainly determining the resistance of the compression beam (21) to being cut by the cutting element (224) in an impact.

6. The aircraft fuselage primary structure as claimed in claim 3, wherein the compression beam (21) comprises, at the first end (213), a starting notch (217) facing the blade (227) when the compression beam (21) is attached to the gusset plate (22).

7. The aircraft fuselage primary structure as claimed in claim 1, wherein the gusset plate (22) is of metallic material, at least in part.

8. The aircraft fuselage primary structure as claimed in claim 1, wherein the at least one structural element (2) transmits normal loads, between the crossmember (14) and the reinforcing fuselage frame (13), which loads correspond to stresses encountered during normal use of the aircraft.

9. The aircraft fuselage primary structure as claimed in claim 8, wherein the normal loads are transmitted by the attaching of the compression beam (21) to the gusset plate (22) using working fixings (215).

10. An aircraft comprising an aircraft fuselage primary structure as claimed in claim 1.

11. An energy-absorbing structural element (2) intended to absorb compressive loads between two structural parts (13, 14) of an aircraft fuselage, the energy-absorbing structural element comprising:
- a compression beam (21) of longitudinal axis Z made of composite material, said material comprising plies of continuous fibers held in place by a resin, said longitudinal axis Z being directed substantially in a direction of compressive forces that are to be absorbed in the event of an impact, and
- at least one gusset plate (22), attached at least to one of the ends (213, 214) of the compression beam (21) and intended to transmit the compressive loads to the structural part to which said gusset plate is attached, said gusset plate comprising:
    - guide means (223) for guiding the beam (21) substantially along its longitudinal axis Z,
    - a cutting element (224) for cutting the compression beam (21) into at least two strips, in the direction of the longitudinal axis Z, and
    - a clearance groove (225) for each of said at least two strips.

12. The energy-absorbing structural element (2) as claimed in claim 11, wherein a said gusset plate (22) is attached to each of the ends (213, 214) of the compression beam (21).

13. The aircraft fuselage primary structure as claimed in claim 2, wherein the compression beam (21) comprises plies directed substantially along the longitudinal axis Z mainly characterizing the longitudinal strength of the compression beam and plies that are inclined with respect to the direction of the longitudinal axis Z mainly determining the resistance of the compression beam (21) to being cut by the cutting element (224) in an impact.

14. The aircraft fuselage primary structure as claimed in claim 2, wherein the compression beam (21) comprises, at the first end (213), a starting notch (217) facing said cutting element (224) when the compression beam (21) is attached to the gusset plate (22).

15. The aircraft fuselage primary structure as claimed in claim 2, wherein the gusset plate (22) is of metallic material, at least in part.

16. The aircraft fuselage primary structure as claimed in claim 2, wherein the at least one structural element (2) transmits normal loads, between the crossmember (14) and the reinforcing fuselage frame (13), which loads correspond to stresses encountered during normal use of the aircraft.

\* \* \* \* \*